(12) United States Patent
Guillerm et al.

(10) Patent No.: US 8,375,150 B2
(45) Date of Patent: Feb. 12, 2013

(54) FAST HDMI SWITCHING WITH CONDITIONAL RESET MECHANISM

(75) Inventors: Nicolas Guillerm, Villons les Buissons (FR); Guillaume Bertrand, Troarn (FR)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 12/839,085

(22) Filed: Jul. 19, 2010

(65) Prior Publication Data

US 2011/0022739 A1  Jan. 27, 2011

(30) Foreign Application Priority Data

Jul. 21, 2009  (EP) ..................................... 09290576

(51) Int. Cl.
*G06F 3/00* (2006.01)
*G06F 21/00* (2006.01)
(52) U.S. Cl. ........................................... 710/18; 726/11
(58) Field of Classification Search .................... 710/18; 348/554
See application file for complete search history.

(56) References Cited

U.S. PATENT DOCUMENTS

| 2006/0028362 | A1* | 2/2006 | Fujiwara | 341/110 |
|---|---|---|---|---|
| 2008/0074555 | A1* | 3/2008 | Chen et al. | 348/720 |
| 2008/0317440 | A1* | 12/2008 | Shoji et al. | 386/124 |
| 2009/0190033 | A1* | 7/2009 | Asada et al. | 348/554 |
| 2009/0219447 | A1* | 9/2009 | Choi | 348/725 |
| 2009/0222905 | A1* | 9/2009 | Choi et al. | 726/11 |
| 2011/0013772 | A1* | 1/2011 | Roethig et al. | 380/200 |

FOREIGN PATENT DOCUMENTS

| JP | 2007-089013 A | 4/2007 |
|---|---|---|
| JP | 2007089013 A * | 4/2007 |
| JP | 2009-141642 A | 6/2009 |
| WO | 2009/108818 A1 | 9/2009 |

OTHER PUBLICATIONS

"High-Bandwidth Digital Content Protection Specification Compliance Test Specification Revision 1.1.", Intel Corporation, 133 pgs., retrieved from the Internet at: http://www.digital-cp.com/files/static_page_files/804CB940-129D-4C12-C19A004B63F141C5/HDCPSpecificationComplianceTestSpecification1_1.pdf (Jun. 14, 2006).
"HDMI Specification Version 1.3a", Hitachi et al., 237 pgs., retrieved from the Internet at: http://www.dybkowski.comule.com/download/hdmi/hdmi_spec_1.3_gm1.pdf (Jun. 22, 2006).
"High-Bandwidth Digital Content Protection System v1.3," Digital Content Protection LLC, 209 pgs., retrieved from the Internet at: http://www.digital-cp.com/files/static_page_files/3313F48C-DB6F-D9D2-67EB2678F1D5DCAF/HDCP%20on%20DisplayPort%20Specification%20Rev1_1.pdf (Jan. 15, 2010).
Extended European Search Report for European Patent Appln. No. 09290576.9 (Dec. 14, 2009).

* cited by examiner

*Primary Examiner* — Henry Tsai
*Assistant Examiner* — Titus Wong

(57) ABSTRACT

Various exemplary embodiments relate to a High-Definition Multimedia Interface (HDMI) switch configured to receive notification of a switch from a current HDMI source to a new HDMI source, determine whether the new HDMI source is actively transmitting data, has attempted to access an HDCP register before a predetermined timeout delay since a last HDCP register access, and is transmitting unencrypted data, and based on these determinations, either immediately begin transmission of the HDMI data received from the new source or reset the new HDMI source. In this manner, various exemplary embodiments enable switching between HDMI sources with a reduced delay.

20 Claims, 5 Drawing Sheets

FAST HDMI SWITCHING WITH CONDITIONAL RESET MECHANISM

This application claims the priority under 35 U.S.C. §119 of European patent application no. 09290576.9, filed on Jul. 21, 2009, the contents of which are incorporated by reference herein.

FIELD OF THE INVENTION

Embodiments disclosed herein relate generally to switching between multiple High-Definition Multimedia Interface (HDMI) sources and, more particularly, but not exclusively, to reducing the time required to switch between such sources.

BACKGROUND OF THE INVENTION

With the advent of high definition (HD) signals and advanced high resolution display technologies, such as Liquid Crystal Display (LCD) and Plasma, consumers now demand a higher quality of video and audio than ever before. In response to this demand, many content creators, ranging from movie studios to game developers, have begun to produce content that utilizes HD signals. This expansion of HD content has created the need for a simple, yet high-speed communication interface for transmission of digital content between the source and the display device.

The High-Definition Multimedia Interface, commonly known as HDMI, is a digital connection standard that addresses this need. Cables implemented according to the HDMI standard are capable of transmitting both video and audio at high data rates. Given its convenience and high capacity, HDMI has quickly become the preferred connection type for end users, content creators, and equipment manufacturers alike.

As with any system for digital transmission of copyrighted or otherwise regulated data, content protection for HDMI signals is a critical issue. The High-Bandwidth Digital Content Protection (HDCP) system provides one solution for protection of content transmitted over HDMI. In particular, HDCP protects content transmitted over HDMI from a content source, such as a set-top box or high definition disc player (e.g., a BluRay™ disc player), to a display, such as a high-definition television.

In order to properly protect an HDMI link between a source and a receiver (commonly known as a "sink"), the source must first authenticate the sink to verify that the sink is authorized to receive the data. After the source has properly authenticated the sink, the source may begin sending encrypted data over the link. Unfortunately, the entire authentication operation, including pre-authentication processing, is often time consuming, taking in the order of five seconds to complete. In particular, the time required to read Extended Display Identification Data (EDID) from the sink during pre-authentication can take a number of seconds. This is particularly problematic when a user desires to switch between HDMI sources, as the user will experience a noticeable delay with no picture.

In a current implementation for addressing the duration of input switches, the HDMI sink maintains the HDCP authentication for each input, even when the input is not currently selected. Although effective in reducing the duration of input switches, this implementation requires an HDCP engine for each input and therefore requires additional hardware and a large amount of power. These deficiencies increase the cost of implementing this solution for both equipment manufacturers and consumers.

In view of the foregoing, it would be desirable to implement a fast HDMI switching mechanism. More specifically, it would be desirable to implement an HDMI switching mechanism that effectively reduces the duration of input switches, while minimizing costs to manufacturers and consumers. Other desirable aspects will be apparent to those of skill in the art upon reading and understanding the present specification.

SUMMARY OF THE INVENTION

In light of the present need for maintaining fast switching between HDMI sources, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to an HDMI switch and a related method for communication with a plurality of HDMI sources and an HDMI receiver that supports High-Bandwidth Digital Content Protection (HDCP). The switch may include a plurality of HDMI inputs, each HDMI input corresponding to a respective HDMI source and comprising a differential clock channel, a plurality of TMDS differential data channels, and a display data channel (DDC). The switch may also include an HDMI output, the HDMI output including a differential clock output, a DDC output, and a plurality of TMDS data outputs. Finally, the switch may include HDMI switching circuitry configured to receive notification of a switch from a current HDMI source to a new HDMI source and determine whether the new HDMI source is actively transmitting data, has attempted to access at least one HDCP register within a predetermined timeout delay since a previous HDCP register access, and is transmitting unencrypted data.

When the new HDMI source is actively transmitting data, has attempted to access at least one HDCP register within the predetermined timeout delay, and is transmitting unencrypted data, the HDMI switch may proceed without a reset of the new HDMI source and output data received from the HDMI input corresponding to the new HDMI source over the HDMI output of the HDMI switch. Alternatively, when the new HDMI source is not actively transmitting data, has not attempted to access the HDCP register during the predetermined timeout delay since the previous HDCP register access, or is transmitting encrypted data, the HDMI switch may reset the new HDMI source.

In this manner, by only resetting the new HDMI source when necessary, various exemplary embodiments significantly reduce the time required for most switches to new HDMI sources. This results in an improved quality of experience for users, as the delay in display of the new source is significantly reduced. In addition, because the HDMI receiver need not maintain each source in the authenticated state, the HDMI receiver requires only a minimal increase in power consumption.

BRIEF DESCRIPTION OF THE DRAWINGS

In order to facilitate better understanding of various exemplary embodiments, reference is made to the accompanying drawings, wherein.

DETAILED DESCRIPTION OF THE EMBODIMENTS

Figure 1:
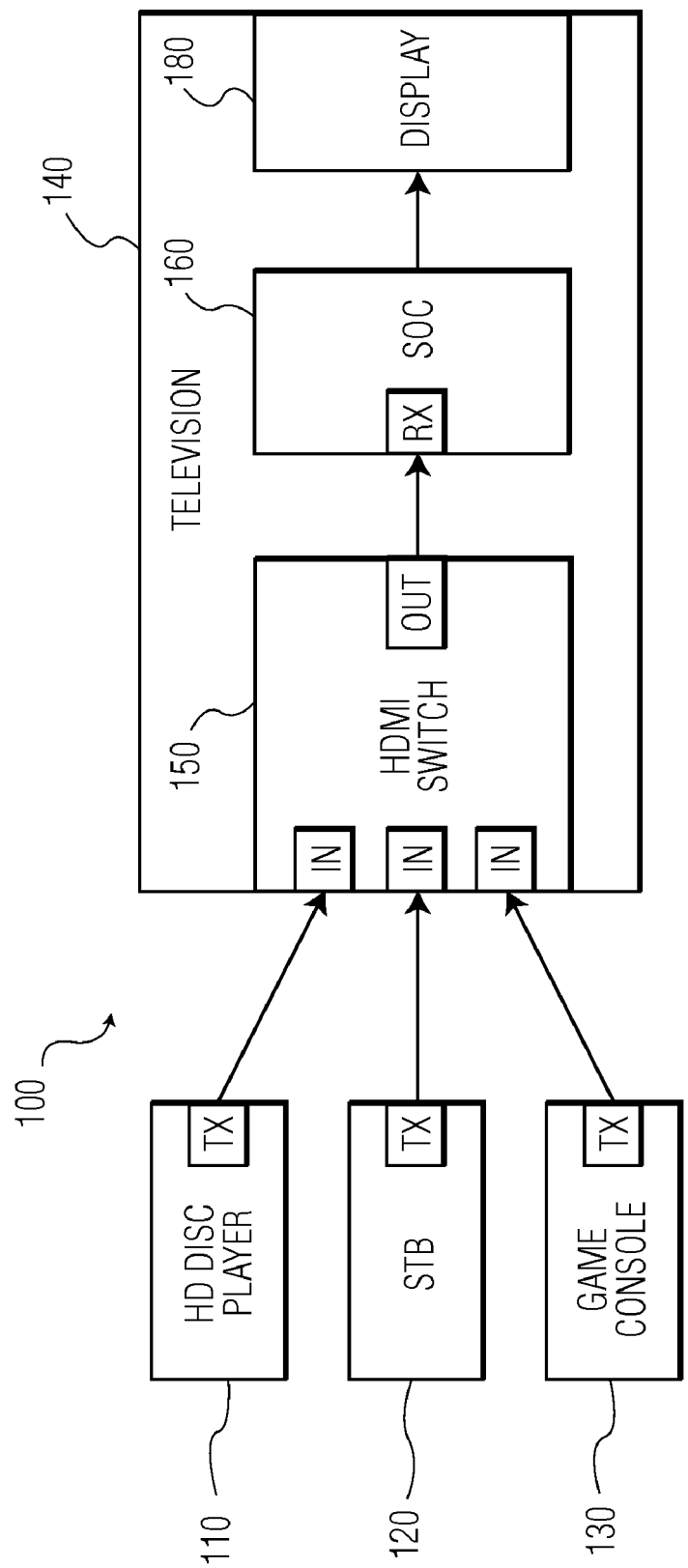
FIG. 1 is a schematic diagram of an exemplary system for switching between HDMI sources that may use HDCP.

Referring now to the drawings, in which like numerals refer to like components or steps, there are disclosed broad aspects of various exemplary embodiments.

FIG. 1 is a schematic diagram of an exemplary system 100 for switching between HDMI sources that may use HDCP. System 100 includes HD disc player 110, set-top box 120, game console 130, and television 140. Television 140 may include HDMI switch 150, System-on-Chip (SOC) 160 with HDMI receiver 170, and display 180.

System 100 may include a number of HDMI sources or transmitters, such as HD disc player 110, set-top box 120, and game console 130. It should be apparent that other sources may be used in system 100, including, but not limited to, personal or laptop computers, DVD players, and satellite receivers.

One or more of these sources may be configured to communicate with HDMI receiver 170 using HDCP, through HDMI switch 150. In particular, the HDMI source may negotiate encryption with HDMI receiver 170 (also known as a "sink"), then transmit encrypted content from its respective transmitter. In this manner, the transmitter may protect the data transmitted to television 140 from unauthorized access. Further details regarding HDCP are provided below and in the specification of the "High-Bandwidth Digital Content Protection System," Revision 1.3, incorporated by reference herein in its entirety.

Television 140 may be coupled to each HDMI source and configured to allow a user to switch between sources. It should be apparent that, although system 100 is illustrated as including a television 140, HDMI receiver 170 and the corresponding HDMI switch 150 may be included in any HDMI reception devices, including, but not limited to, digital projectors, amplifiers, audio/video receivers, and switch boxes.

HDMI switch 150 may include a plurality of HDMI inputs, each capable of receiving an HDMI signal outputted from an HDMI source. As illustrated, HD disc player 110 is connected to a first input, set-top box 120 is connected to a second input, and game console 130 is connected to a third input. As described in further detail below, HDMI switch 150 may be configured to select a particular source for output to receiver 170.

System-on-Chip (SOC) 160 may be an integrated circuit (IC) configured to perform operations required prior to display of the selected signal. In particular, HDMI receiver 170 of SOC 160 may receive the HDMI signal outputted from HDMI switch 150. SOC 160 may then perform operations required to display the content, including decrypting the signal if necessary, extracting video frames from the signal, and performing image processing. SOC 160 may then output the processed video to display 180 for display to the user. Other suitable operations performed by SOC 160 will be apparent to those of skill in the art.

Having described the components of system 100, a brief summary of the operation of system 100 will be provided. It should be apparent that the following description is intended to provide an overview of the operation of system 100 and HDMI switch 150 and is therefore a simplification in some respects. The detailed operation of HDMI switch 150 will be described in further detail below in connection with FIGS. 2A, 2B, 3, 4, and 5.

In operation, a user of television 140 may desire to switch from a current HDMI input to a new HDMI input. Alternatively, a switch from a current input to a new input may be triggered automatically based on receipt of a Consumer Electronics Control (CEC) command from another device. Assuming that HDCP is required to protect the content transmitted from the new source (HDCP transmitter) to HDMI receiver 170 (HDCP sink), the transmitter and sink must first perform an authentication phase prior to transmitting protected data over the HDMI connection.

According to the HDCP specification, however, prior to beginning authentication, the HDCP transmitter must detect the presence of the HDCP sink and verify that the HDCP sink is HDMI or DVI capable by reading the Extended Display Identification Data (EDID) from the sink. The transmitter will then enter "State A0, Wait For Active Receiver," in which the transmitter sends an unencrypted stream of low value content (e.g., blue screen) or an informative screen, while repeatedly attempting to reach an HDCP register in the sink. The authentication phase may begin only when the transmitter enters State A0.

As should be apparent, the steps required to enter State A0 may be time-consuming, resulting in a noticeable delay to the user upon a switch to a new HDMI source. In particular, in some current implementations, the HDCP sink always applies a Hot Plug Detect (HPD) low pulse, which causes a reset of the HDCP source. This reset, in turn, necessitates execution of each of the steps leading to State A0 prior to the start of HDCP authentication. In such implementations, the delay experienced by the user prior to display of the new HDMI source may be upwards of 5 seconds.

Various exemplary embodiments reduce the delay in switching between HDMI sources by determining whether the HDCP transmitter is in State A0 and, if so, immediately starting output of the HDMI source from HDMI switch 150. In particular, as described in further detail below, HDMI switch 150 may include a number of detectors for regulating activity of each HDMI source. These detectors may be configured to determine: (1) whether the new HDMI source is actively transmitting data; (2) whether the new HDMI source has attempted to access an HDCP register of receiver 170 before a predetermined timeout delay since a previous HDCP register access; and (3) whether the new HDMI source is transmitting unencrypted data.

When each of these conditions is met, HDMI switch 150 may determine that the new HDMI source is in State A0 or is a non-HDCP source and immediately begin output of the unencrypted data stream. If necessary, HDCP authentication may start immediately thereafter. On the other hand, when one or more of these conditions is not met, HDMI switch 150 may determine that the new HDMI source is in an undefined state and that a reset of the new source is necessary. HDMI switch 150 may therefore apply a HPD low pulse using a Hot Plug Detect control module, causing a reset of the new source.

Figure 2A:
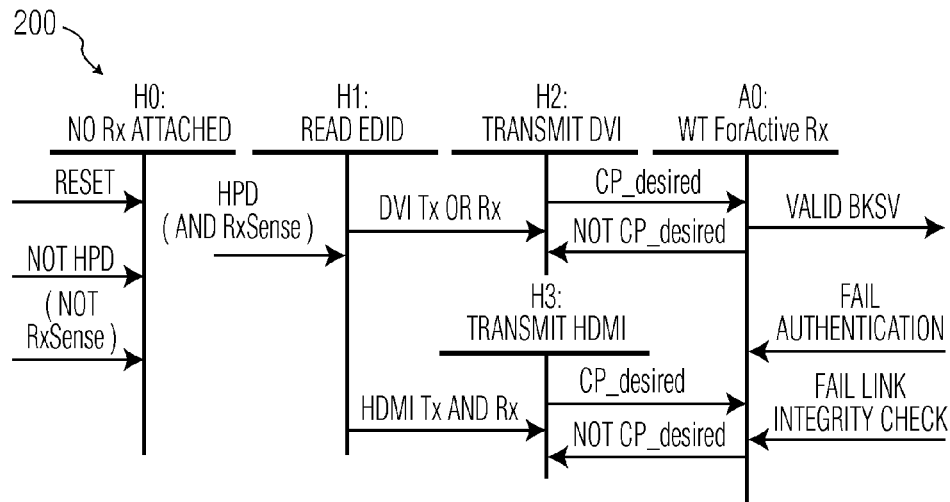
FIG. 2A is an exemplary state diagram of a plurality of pre-authentication states of an HDCP transmitter.

FIG. 2A is an exemplary state diagram 200 of a plurality of pre-authentication states of an HDCP transmitter. As mentioned above, prior to beginning HDCP authentication, the HDCP transmitter may be required to perform a number of steps. This figure illustrates a number of states and the conditions required to transition to and from each state. Further details are provided in the HDCP specification.

Initially, the HDCP transmitter enters State H0, No Receiver Attached, when a reset condition occurs or when the HDCP sink toggles the Hot Plug Detect signal. Upon detection of an attached sink device and a determination that the EDID memory of the sink is readable, the HDCP transmitter transitions to State H1, Read EDID. In state H1, the transmitter reads the EDID memory of the sink to determine the capabilities of the sink, including whether the sink is HDMI or DVI-ready. If both the transmitter and sink are HDMI-ready, the transmitter enters state H3, Transmit HDMI, where the transmitter begins transmitting a video signal (e.g., a blue screen or other informative display). Alternatively, if the transmitter or the sink is DVI-ready only, the transmitter enters state H2, Transmit DVI, where the transmitter begins transmitting a video signal (e.g., a blue screen or other informative display). If HDCP protection is desired, the transmitter enters State A0, Wait for Active Receiver, where the transmitter awaits the availability of an HDCP sink.

As detailed above, various exemplary embodiments allow an HDMI switch to determine whether the transmitter is in State A0. In this manner, when the transmitter is in State A0, the receiver may avoid the need to reset the transmitter and thereby eliminate the time required to execute the steps required to transition from State H0 to State A0. This manner of operation significantly reduces delay periods experienced by the user.

Figure 2B:
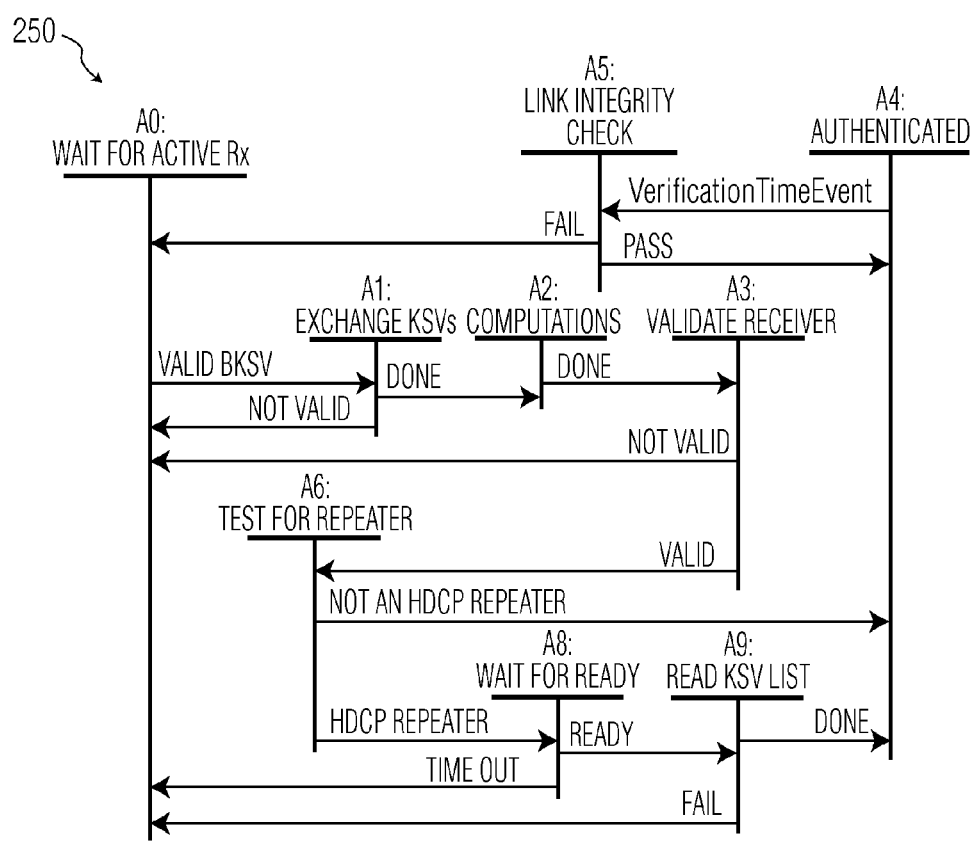
FIG. 2B is an exemplary state diagram of a plurality of authentication states of an HDCP transmitter.

FIG. 2B is an exemplary state diagram of a plurality of authentication states of an HDCP transmitter. After the transmitter has entered State A0 and the transmitter has successfully read an HDCP register in the sink, the authentication procedure may begin. In particular, the transmitter and sink may exchange key selection vectors in State A1 and perform a number of computations in State A2. The transmitter may then use the results of these computations to determine whether the sink is properly validated in State A3. When the sink has been properly validated, the transmitter may proceed to the authenticated state, State A4, after checking the HDCP Repeater condition, State A6, and beginning to send encrypted content over the HDMI connection to the sink. Further details regarding the authentication process performed by the transmitter and sink may be found in the HDCP specification.

Figure 3:
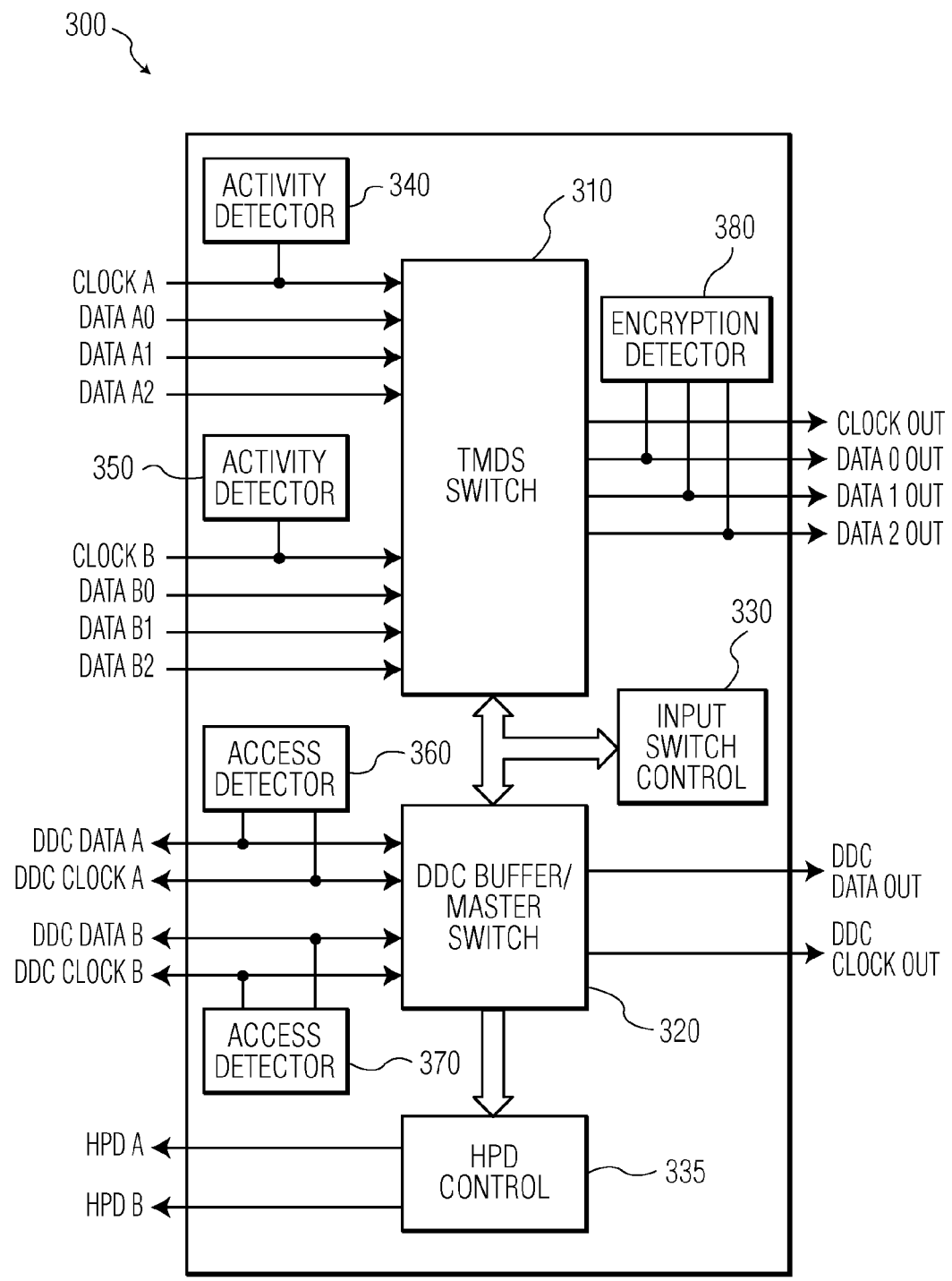
FIG. 3 is a schematic diagram of a first embodiment of an exemplary HDMI switch for fast switching between HDMI sources that may utilize HDCP.

FIG. 3 is a schematic diagram of a first embodiment of an exemplary HDMI switch 300 for fast switching between HDMI sources that may utilize HDCP. As illustrated, switch 300 may include a plurality of HDMI inputs, each coupled to a corresponding HDMI transmitter (not shown) and an HDMI output coupled to an HDMI receiver (not shown). Switch 300 may also include HDMI switching circuitry, which may comprise a number of semiconductor devices, integrated circuits, or other electrical circuits configured to manage the switch from a current HDMI source to a new HDMI source. In particular, switch 300 may include TMDS switch 310, a DDC Buffer/Master Switch 320, an Input Switch Control 330, a Hot Plug Detect (HPD) control 335, a plurality of activity detectors 340, 350, a plurality of access detectors 360, 370, and an encryption detector 380. Other suitable components and arrangements for implementing the HDMI switching circuitry will be apparent to those of skill in the art.

HDMI Switch 300 is illustrated as including two sets of lines, A and B, each set corresponding to a particular HDMI source. Each of these sets of lines may include a differential clock channel, a set of TMDS differential data channels, a data display channel (DDC) channel, and a Hot Plug Detect (HPD) output. Thus, for HDMI source A, the lines include Clock A, Data A0, Data A1, Data A2, DDC Data A, DDC Clock A, and HPD A. For HDMI source B, the lines include Clock B, Data B0, Data B1, Data B2, DDC Data B, DDC Clock B, and HPD B. Although illustrated as a single line for simplicity, each of these lines may include two lines, thereby allowing for Transition Minimized Differential Signaling (TMDS). Furthermore, although illustrated as including two sets of lines, it should be apparent that any number of sets may be used, thereby allowing receiver 300 to switch between a plurality of sources.

HDMI Switch 300 may also include TMDS switch 310, which may be coupled to the clock and data channels of each source. TMDS switch 310 may include circuitry for selectively outputting the clock and data signal corresponding to a selected HDMI source over a set of output channels (Clock Out, Data 0 Out, Data 1 Out, and Data 2 Out).

HDMI Switch 300 may also include a DDC Buffer/Master Switch 320, which may be coupled to TMDS switch 310 and Input Switch Control 330. More specifically, DDC Buffer/Master Switch 320 may be coupled to a data display channel from each HDMI source. DDC Buffer/Master Switch 320 may receive a DDC data line and clock line over a first channel from a first source (DDC Data A and DDC Data B) and receive a DDC data line and clock line over a second channel from a second source (DDC Data B and DDC Clock B). DDC Buffer/Master Switch 320 may also be configured to forward the DDC data and clock of the currently-selected HDMI source over its outputs (DDC Data Out, DDC Clock Out). In this manner, DDC Buffer/Master Switch 320 may forward register access requests from the HDCP transmitter to HDCP registers located in the HDMI receiver 170, thereby allowing for access to data used during the HDCP authentication and encryption processes.

Input Switch Control 330 may be a module for communication between components in receiver 300 and may comprise a dedicated pin or pins, an I2C bus, an embedded CEC module, or another communication bus. Input Switch Control 330 may manage the notification of a switch to a new HDMI source and control TDMS switch 310, DDC Buffer/Master Switch 320, and HPD control 335. In this manner, Input Switch Control 330 may notify each of the components of the occurrence of a switch, such that the components may poll or otherwise receive a determination from the corresponding detector(s), then take an appropriate action based on that determination.

HDMI Switch 300 may also include a Hot Plug Detect Control 335 which may be coupled to TMDS switch 310, DDC Buffer/Master Switch 320, and Input Switch Control 330. Hot Plug Detect Control 335 may be coupled to the Hot Plug Detect line to each HDMI source. In particular, Hot Plug Detect Control 335 may control the HPD line of a first source (HPD A) and control the HPD line of a second source (HPD B). Hot Plug Detect Control 335 may be configured to apply a HPD low pulse over a particular line to a given HDMI source, causing a reset of the source connected to the line.

HDMI Switch 300 may also include a plurality of activity detectors, one for each HDMI input. More specifically, activity detector 340 may be coupled to Clock A, while activity detector 350 may be coupled to Clock B. Each activity detector may comprise circuitry configured to determine whether the corresponding HDMI source is actively transmitting HDMI data. In particular, each activity detector may read the particular clock input to measure the frequency of the clock input. When the clock input remains stable at a particular frequency, the activity detector may determine that the corresponding source is actively transmitting data and communicate that determination to TMDS switch 310. Alternatively, when the clock input does not remain stable, the activity detector may determine that the source is not actively transmitting data and communicate that determination to TMDS switch 310.

In various exemplary embodiments, activity detector 350 may be further configured to determine whether the frequency remains stable within a predetermined range. In these embodiments, activity detector may determine that the source is actively transmitting data only when the clock remains stable at a particular frequency and the particular frequency is within the predetermined range. Suitable frequency ranges for implementation of activity detector will be apparent to those of skill in the art. For example, activity detector may define the range as 25 megahertz to 340 megahertz, a range corresponding to a minimum and maximum operating frequency of a valid HDMI data stream.

It should be apparent that, although described as accessing the clock channels to detect activity, activity detectors 340, 350 may instead directly monitor the data channels for activity. As an example, activity detector 340 could instead monitor Data A0, Data A1, and Data A2, while activity detector 350 could monitor Data B0, Data B1, and Data B2.

HDMI Switch 300 may also include a plurality of access detectors, one for each HDMI input. More specifically, access detector 360 may be coupled to both DDC Data A and DDC Clock A, while access detector 370 may be coupled to DDC Data B and DDC Clock B. Each access detector may comprise circuitry configured to determine whether the corresponding HDMI source has attempted to access an HDCP register before a predetermined timeout delay since a last HDCP register access.

In particular, each access detector may monitor the DDC lines for requests to access an HDCP register. This determination may be made, for example, by monitoring the data stream in the DDC data line using the DDC clock line. For example, the access detector may monitor for requests to the HDCP register at slave addresses 0x74 or 0x75, which correspond to a primary link, or slave addresses 0x76 or 0x77, which correspond to a secondary link.

Upon detection of an HDCP register access, the access detector may begin a timer and monitor for a next HDCP register access. The timer may be reset upon detection of TMDS activity by the corresponding activity detector 340, 350. When the access detector identifies an HDCP access from the HDMI source before the predetermined timeout delay, the access detector may determine that the corresponding source has repeatedly attempted to access an HDCP register and communicate this determination to HPD Control 335. Alternatively, when the access detector fails to identify an HDCP access from the HDMI source before the predetermined timeout delay, the access detector may determine that the corresponding source has not repeatedly attempted to access the HDCP register and communicate this determination to HPD Control 335.

Suitable timeout delays for use in the detection of HDCP register access by the HDMI source will be apparent to those of skill in the art. For example, when the previous HDCP register access from the HDMI source was acknowledged by the HDCP sink, the predetermined timeout delay may be equal to 128 frames. As an example, in the case of an HDMI source with a frame rate of 23.976 hertz, this delay may be 5.4 seconds. Alternatively, when the previous HDCP register access from the HDMI source was not acknowledged by the HDCP sink, the predetermined timeout delay may be equal to 2 seconds. Other suitable timeout delays will be apparent to those of skill in the art.

As described above, the access detector may monitor for an HDCP register access only when an initial access has been detected. Because a non-HDCP source will not trigger an initial register access, the access detector will not start monitoring for a register access from such a source. In this manner, the access detector will not trigger a reset for switches to non-HDCP sources, such that HDMI switch 300 will immediately switch to the non-HDCP source.

HDMI Switch 300 may also include an encryption detector 380 coupled to each data output of TMDS switch 310. Encryption detector 380 may comprise circuitry configured to determine whether the corresponding HDMI source is transmitting unencrypted data. In particular, encryption detector 380 may monitor data streams outputted from the plurality of data outputs for an encryption flag. When inspection of the encryption flag indicates that encryption is disabled for all inspected frames, encryption detector 380 may determine that the HDMI source is transmitting unencrypted data and communicate this determination to HPD Control 335. Alternatively, when inspection of the encryption flag indicates that encryption is enabled for at least one of inspected frames, encryption detector 380 may determine that the HDMI source is transmitting encrypted data and communicate this determination to HPD Control 335.

As an example of this determination, encryption detector 380 may monitor the data stream for Enhanced Encryption Status Signaling (EESS) included in the control signals CTL3, CTL2, CTL1, and CTL0. For example, if encryption detector 380 detects that the control signals include the bit pattern, "1001," encryption detector 380 may determine that encryption is enabled for the current frame. In contrast, if encryption detector 380 detects that the control signals include the bit pattern, "0001," encryption detector may determine that encryption is disabled for the current frame.

It should be apparent that, because encryption detector 380 is located after TMDS switch 310, TMDS switch 310 may immediately commute the incoming TMDS stream upon notification of a switch to a new HDMI source. To account for any delay in processing by encryption detector 380, TMDS switch 310 may temporarily disable additional output after output of an amount of data sufficient for encryption detection.

In operation, Input Switch Control 330 may notify TMDS switch 310, DDC Buffer/Master Switch 320, and/or HDP Control 335 of a switch from a current HDMI source to a new HDMI source. TMDS switch 310, DDC Buffer/Master Switch 320, and/or HDP Control 335 may then poll or otherwise receive information from encryption detector 380 and the corresponding activity and access detectors. Based on this information, the corresponding components may determine: (1) whether the new HDMI source is actively transmitting data; (2) whether the new HDMI source has attempted to access an HDCP register of the sink before a predetermined timeout delay since a last register access; and (3) whether the new HDMI source is transmitting unencrypted data.

When each of these conditions is met, HDMI switch 300 may determine that the new HDMI source is in State A0 or is a non-HDCP source and therefore proceed without resetting the new source. In this manner, if the new HDMI source is an HDCP source, HDCP authentication may immediately begin. On the other hand, when one or more of these conditions is not met, HDMI switch 300 may determine that the new HDMI source is in an undefined state and that a reset of the new source is necessary. Hot Plug Detect Control 335 may therefore apply a Hot Plug Detect low pulse, thereby causing reset of the new source.

Figure 4:
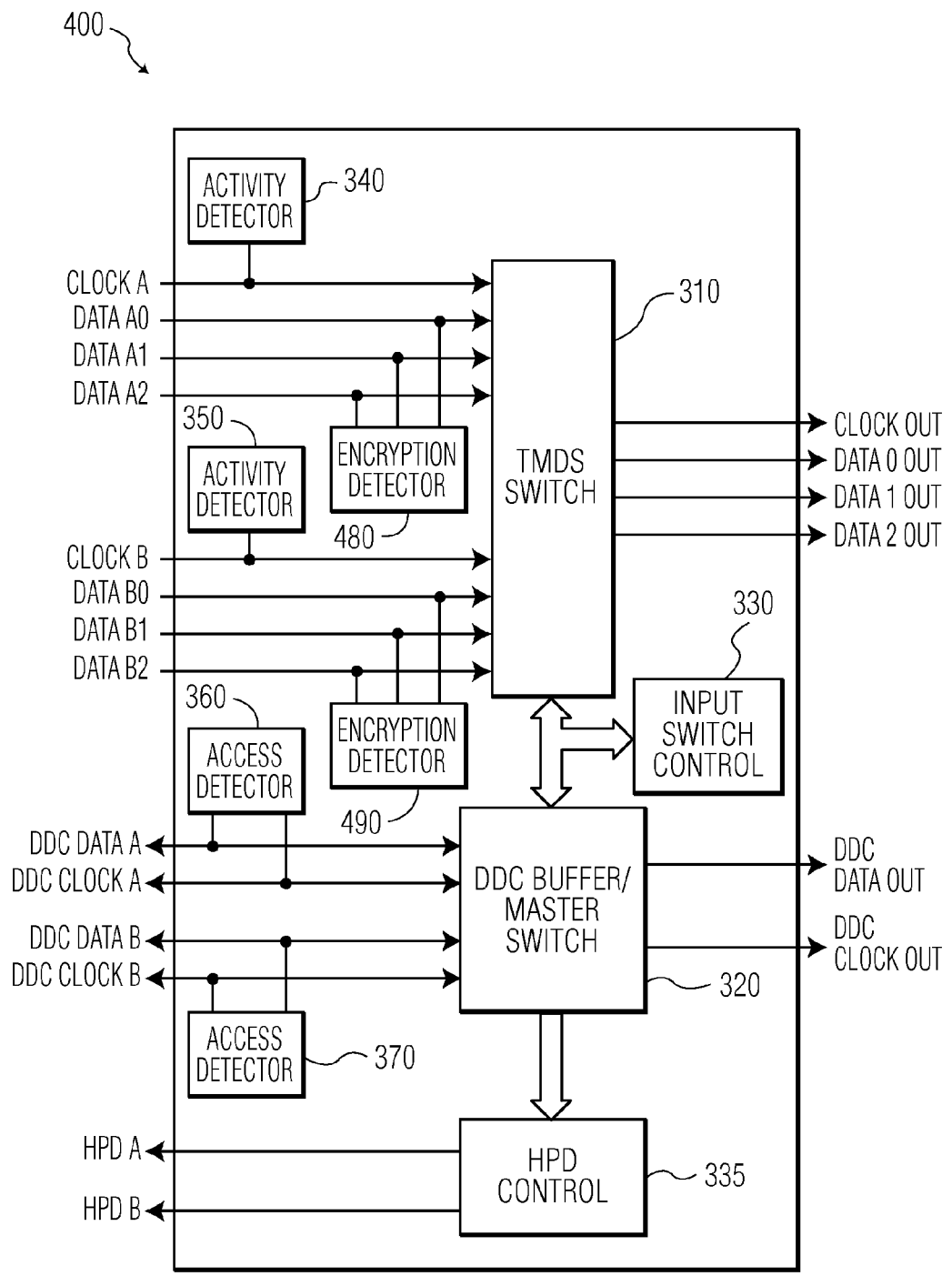
FIG. 4 is a schematic diagram of a second embodiment of an exemplary HDMI switch for fast switching between HDMI sources that may utilize HDCP.

FIG. 4 is a schematic diagram of a second embodiment of an exemplary HDMI switch 400 for fast switching between HDMI sources that may utilize HDCP. HDMI switch 400 may include a number of components similar to those discussed above in connection with HDMI switch 300 of FIG. 3, including TMDS switch 310, DDC Buffer/Master Switch 320, Input Switch Control 330, Hot Plug Detect Control 335, activity detectors 340, 350, access detectors 360, 370, and a number of inputs and outputs.

Rather than including a single encryption detector coupled to the outputs of TMDS switch 310, HDMI switch 400 may instead include one encryption detector for each HDMI source. In particular, encryption detector 480 may be coupled to each data line of input A (Data A0, Data A1, and Data A2), while encryption detector 490 may be coupled to each data line of input B (Data B0, Data B1, and Data B2).

Each encryption detector 480, 490 may operate similarly to encryption detector 380. In particular, each encryption detector may monitor data streams inputted into a respective set of inputs corresponding to an HDMI source for an encryption flag. When inspection of the encryption flag indicates that encryption is disabled for all frames, the encryption detector 480, 490 may determine that the corresponding HDMI source is transmitting unencrypted data and communicate this determination to Hot Plug Detect Control 335. Alternatively, when inspection of the encryption flag indicates that encryption is enabled for at least one frame, encryption detector 480, 490 may determine that the HDMI source is transmitting encrypted data and communicate this determination to Hot Plug Detect Control 335. As with encryption detector 380, this detection can be based on EESS control signals or Original Encryption Status Signaling (OESS) control signals if the stream is transmitted using DVI.

HDMI switch 400 may therefore have a quicker response time, as each encryption detector 480, 490 may continuously monitor the TDMS stream sent by the HDMI source. Furthermore, the decision regarding encryption of the stream may be made quickly, as encryption detectors 480, 490 may monitor the stream before equalizer calibration and switching commutation.

Figure 5:
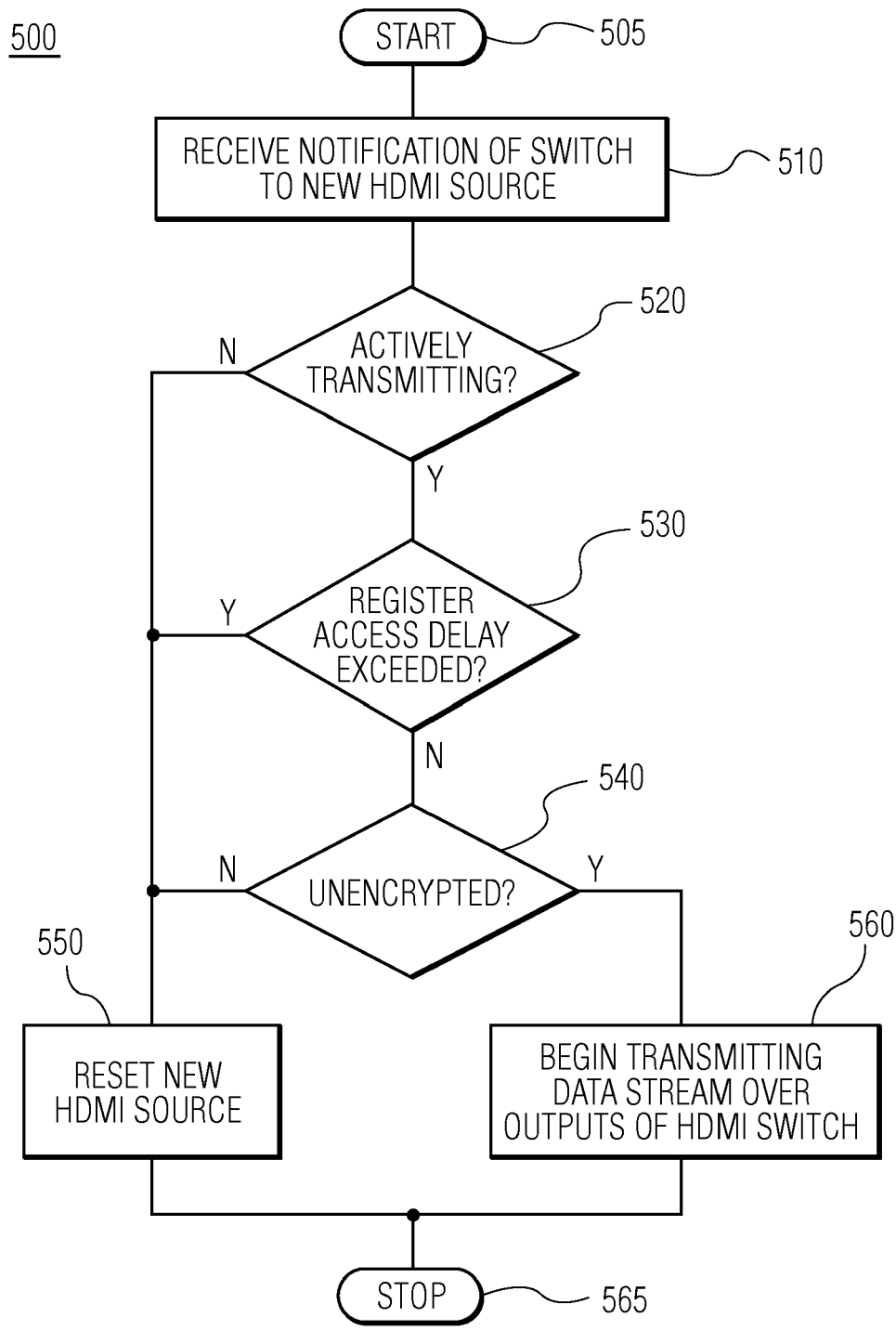
FIG. 5 is a flowchart of an exemplary method for fast switching between HDMI sources that may utilize HDCP.

FIG. 5 is a flowchart of an exemplary method 500 for fast switching between HDMI sources that may utilize HDCP. Method 500 may be executed by, for example, components of an HDMI switch 300, 400. Other suitable components for execution of method 500 will be apparent to those of skill in the art.

Method 500 starts in step 505 and proceeds to step 510, where Input Switch Control 330 receives notification of a switch from a current HDMI source to a new HDMI source. In step 520, TMDS switch 310 may determine whether the new HDMI source is actively transmitting data based on a determination received from a respective activity detector 340, 350. In step 530, DDC Buffer/Master Switch 320 may determine whether the new HDMI source has attempted to access an HDCP register before a predetermined timeout delay since a last register access based on a determination received from a respective access detector 360, 370. In step 540, TMDS switch 310 may determine whether the new HDMI source is transmitting unencrypted data based on a determination received from a single encryption detector 380 or from a respective encryption detector 480, 490.

When the determination is negative in either of steps 520, or 540, or the determination is positive in step 530, method 500 proceeds to step 550, where HDMI switch 300, 400 may determine that the new HDMI source is in an undefined state and that a reset of the new source is necessary. Hot Plug Detect Control 335 may therefore apply a Hot Plug Detect low pulse, thereby causing reset of the new source. Method 500 then proceeds to step 565, where method 500 stops.

Alternatively, when the determination is positive in steps 520 and 540, and negative in step 530, method 500 proceeds to step 560, where HDMI switch 300, 400 may determine that the new HDMI source is in State A0 and that a reset is therefore unnecessary. TMDS switch 310 may therefore continue output (for HDMI switch 300) or begin output (for HDMI switch 400) of the unencrypted data stream, while DDC Buffer/Master Switch 320 may forward the DDC data and clock of the newly-selected HDMI source. HDCP authentication may start immediately thereafter. Method 500 then proceeds to step 565, where method 500 stops.

According to the foregoing, various exemplary embodiments enable fast switching between HDMI sources to significantly decrease the delay time experienced by the user. Furthermore, the solution complies with the HDMI standard, requires minimal power to implement, and reduces expenses of both manufacturers and consumers. Other advantages of the various exemplary embodiments will be apparent to those of skill in the art.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine. Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

The invention claimed is:

1. A High-Definition Multimedia Interface (HDMI) switch for communication with a plurality of HDMI sources and an HDMI receiver that supports High-Bandwidth Digital Content Protection (HDCP), the HDMI switch comprising:
   a plurality of HDMI inputs, each input corresponding to a respective HDMI source and comprising a differential clock channel, a plurality of Transition Minimized Differential Signaling (TMDS) data channels, and a display data channel (DDC);
   an HDMI output, the output including a differential clock output, a plurality of TMDS data outputs, and a DDC output; and
   HDMI switching circuitry configured to:
   receive a notification of a switch from a current HDMI source to a new HDMI source,
   determine, in response to the notification of the switch, whether the new HDMI source is actively transmitting data, has attempted to access at least one HDCP register in the HDMI receiver within a predetermined timeout delay since a previous HDCP register access attempt, and is transmitting unencrypted data, when the new HDMI source is actively transmitting data, has attempted to access the at least one HDCP register within the predetermined timeout delay, and is transmitting unencrypted data, output data received from the HDMI input corresponding to the new HDMI source over the HDMI output without resetting the new HDMI source, and when the new HDMI source is not actively transmitting data, has not attempted to access the at least one HDCP register within the predetermined timeout delay, or is transmitting encrypted data, reset the new HDMI source.

2. The HDMI switch of claim 1, further comprising a plurality of activity detectors, wherein each activity detector is coupled to a respective differential clock channel and is configured to:

read the respective differential clock channel to make a determination whether the respective HDMI source is actively transmitting data, and communicate the determination to a TMDS switch in the HDMI switch.

3. The HDMI switch of claim 2, wherein each activity detector determines that the respective HDMI source is actively transmitting data when a measurement of the frequency of the respective differential clock channel remains stable at a particular frequency.

4. The HDMI switch of claim 3, wherein each activity detector determines that the respective HDMI source is actively transmitting data when the measurement of the frequency of the respective differential clock channel remains stable at a particular frequency within a predetermined range.

5. The HDMI switch of claim 4, wherein the predetermined range is 25 megahertz to 340 megahertz.

6. The HDMI switch of claim 2, wherein each activity detector is further configured to:

communicate the determination to a Hot Plug Detect (HPD) control in the HDMI switch, the HPD control applying an HPD low pulse to reset the respective HDMI source when the determination indicates that the respective HDMI source is not actively transmitting data.

7. The HDMI switch of claim 1, further comprising a plurality of access detectors, wherein each said access detector is coupled to a respective display data channel and is configured to:

start a timer upon detection of the previous HDCP register access on the respective display data channel, monitor the respective display data channel for a next HDCP register access, and make a determination whether the respective HDMI source attempts to access the at least one HDCP register in the HDMI receiver prior to expiration of the predetermined timeout delay.

8. The HDMI switch of claim 7, wherein each said access detector is further configured to:

communicate the determination to a Hot Plug Detect control in the HDMI switch, the HPD control applying an HPD low pulse to reset the respective HDMI source when the determination indicates that the respective HDMI source did not attempt to access the at least one HDCP register prior to expiration of the predetermined timeout delay.

9. The HDMI switch of claim 8, wherein, when the respective HDMI source has not attempted any HDCP register accesses, the timer is not started, such that the HPD control does not reset the respective HDMI source.

10. The HDMI switch of claim 7, wherein:

when the previous HDCP register access from the respective HDMI source was acknowledged by the at least one HDCP register in the HDMI receiver, the predetermined timeout delay is a duration corresponding to 128 frames, and when the previous HDCP register access from the respective HDMI source was not acknowledged by the at least one HDCP register in the HDMI receiver, the predetermined timeout delay is 2 seconds.

11. The HDMI switch of claim 1, further comprising an encryption detector coupled to the plurality of TMDS data outputs of the HDMI switch and configured to:

make a determination whether the new HDMI source is transmitting unencrypted data by monitoring data streams outputted from the plurality of TMDS data outputs for an encryption flag, and communicate the determination to a Hot Plug Detect control in the HDMI switch, the HPD control applying an HPD low pulse to reset the new HDMI source when the determination indicates that the new HDMI source is transmitting encrypted data.

12. The HDMI switch of claim 1, further comprising a plurality of encryption detectors, wherein each encryption detector is coupled to a respective plurality of TMDS data channels and is configured to:

make a determination whether the respective HDMI source is transmitting unencrypted data by monitoring data streams inputted into the respective plurality of TMDS data channels for an encryption flag, and communicate the determination to a Hot Plug Detect control in the HDMI switch, the HPD control applying an HPD low pulse to reset the respective HDMI source when the determination indicates that the respective HDMI source is transmitting encrypted data.

13. A method for processing High-Definition Multimedia Interface (HDMI) data received in an HDMI switch coupled to an HDMI receiver that supports High-Bandwidth Digital Content Protection (HDCP), the method comprising:

receiving, in the HDMI switch, notification of a switch from a current HDMI source to a new HDMI source;

determining, in response to the notification of the switch, whether the new HDMI source is actively transmitting data, has attempted to access at least one HDCP register in the HDMI receiver within a predetermined timeout delay since a previous HDCP register access attempt, and is transmitting unencrypted data;

when the new HDMI source is actively transmitting data, has attempted to access the at least one HDCP register within the predetermined timeout delay, and is transmitting unencrypted data, outputting data received from the new HDMI source over an HDMI output in the HDMI switch without resetting the new HDMI source; and when the new HDMI source is not actively transmitting data, has not attempted to access the at least one HDCP register within the predetermined timeout delay, or is transmitting encrypted data, resetting the new HDMI source.

14. The method of claim 13, further comprising:

reading a differential clock channel corresponding to the new HDMI source to make a determination whether the new HDMI source is actively transmitting data by determining whether a measurement of the frequency of the differential clock channel remains stable at a particular frequency; and communicating the determination to a Time Minimized Differential Signaling (TMDS) switch in the HDMI switch.

15. The method of claim 14, further comprising:
determining whether the measurement of the frequency of the differential clock channel remains stable at the particular frequency within a predetermined range.

16. The method of claim 15, wherein the predetermined range is 25 megahertz to 340 megahertz.

17. The method of claim 13, further comprising:
starting a timer upon detection of the previous HDCP register access on a display data channel corresponding to the new HDMI source;
monitoring the display data channel for a next HDCP register access; and
making a determination whether the new HDMI source attempts to access the at least one HDCP register in the HDMI receiver prior to expiration of the predetermined timeout delay.

18. The method of claim 17, further comprising:
communicating the determination to a Hot Plug Detect (HPD) control in the HDMI switch, the HPD control applying an HPD low pulse to reset the new HDMI source when the determination indicates that the new HDMI source did not attempt to access the at least one HDCP register prior to expiration of the predetermined timeout delay.

19. The method of claim 13, further comprising:
monitoring data streams outputted from a plurality of Time Minimized Differential Signaling (TMDS) data outputs included in the HDMI output for an encryption flag to make a determination whether the new HDMI source is transmitting unencrypted data; and
communicating the determination to a Hot Plug Detect (HPD) control in the HDMI switch, the HPD control applying an HPD low pulse to reset the new HDMI source when the determination indicates that the new HDMI source is transmitting encrypted data.

20. The method of claim 13, further comprising:
monitoring data streams inputted into a plurality of Time Minimized Differential Signaling (TMDS) data channels of the HDMI switch corresponding to the new HDMI source for an encryption flag to make a determination whether the new HDMI source is transmitting unencrypted data; and
communicating the determination to a Hot Plug Detect (HPD) control in the HDMI switch, the HPD control applying an HPD low pulse to reset the new HDMI source when the determination indicates that the new HDMI source is transmitting encrypted data.

* * * * *